US012705698B2

(12) United States Patent
Bitan et al.

(10) Patent No.: US 12,705,698 B2
(45) Date of Patent: Aug. 11, 2026

(54) SMOOTH ZOOM TRANSITION IN HIGH RESOLUTION SENSORS

(71) Applicant: SAMSUNG ELECTRONICS CO., LTD., Suwon-si (KR)

(72) Inventors: Gal Bitan, Tel-Aviv (IL); Eitan Lavi, Tel-Aviv (IL); Yoram Furth, Tel-Aviv (IL); Shai Shamir, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 18/304,053

(22) Filed: Apr. 20, 2023

(65) Prior Publication Data

US 2024/0354896 A1 Oct. 24, 2024

(51) Int. Cl.

| | |
|---|---|
| ***G06T 5/50*** | (2006.01) |
| ***G02B 5/20*** | (2006.01) |
| ***G06T 1/20*** | (2006.01) |
| ***G06T 3/40*** | (2024.01) |
| ***H04N 25/46*** | (2023.01) |

(52) U.S. Cl.

CPC .................. *G06T 5/50* (2013.01); *G02B 5/20* (2013.01); *G06T 1/20* (2013.01); *G06T 3/40* (2013.01); *H04N 25/46* (2023.01); *G06T 2207/20221* (2013.01)

(58) Field of Classification Search

CPC .... G06T 5/50; G06T 1/20; G06T 3/40; G06T 2207/20221; H04N 23/80; H04N 25/46; H04N 23/45; H04N 23/69

See application file for complete search history.

(56) References Cited

U.S. PATENT DOCUMENTS

| | | | |
|---|---|---|---|
| 8,243,171 | B2 | 8/2012 | Legall et al. |
| 8,482,636 | B2 | 7/2013 | Cohen et al. |
| 8,704,917 | B2 | 4/2014 | Rodriguez et al. |
| 9,438,809 | B2 | 9/2016 | Sheikh et al. |
| 10,706,518 | B2 | 7/2020 | Cohen et al. |
| 11,044,407 | B2 | 6/2021 | Jeong et al. |
| 11,057,572 | B1 | 7/2021 | Wang et al. |
| 11,057,577 | B2 | 7/2021 | Kang et al. |
| 11,108,973 | B2 | 8/2021 | Ling et al. |

(Continued)

OTHER PUBLICATIONS

Yang, et al., "Continuous Digital Zooming Using Generative Adversarial Networks For Dual Camera System", In IET Image Processing, vol. 15, Issue 12, Oct. 2021, pp. 2880-2890.

(Continued)

*Primary Examiner* — Kee M Tung
*Assistant Examiner* — Khoa Vu
(74) *Attorney, Agent, or Firm* — Morgan, Lewis & Bockius LLP

(57) ABSTRACT

Aspects of the method, apparatus, non-transitory computer readable medium, and system include obtaining first sensor data and second sensor data. The aspects further include processing the first sensor data using a first processing mode to obtain first image data, wherein the first processing mode is based on a first pixel pattern. The aspects further include processing the second sensor data using a second processing mode to obtain second image data, wherein the second processing mode is based on a second pixel pattern different from the first pixel pattern, and generating an image by combining the first image data and the second image data.

18 Claims, 10 Drawing Sheets

(56) References Cited

U.S. PATENT DOCUMENTS

| | | | | |
|---|---|---|---|---|
| 11,218,641 | B2 | 1/2022 | Liu et al. | |
| 11,412,191 | B2 | 8/2022 | Yadav et al. | |
| 2011/0157387 | A1* | 6/2011 | Han | H04N 23/69 348/E5.03 |
| 2011/0242342 | A1* | 10/2011 | Goma | H04N 23/90 348/E5.024 |
| 2017/0064263 | A1* | 3/2017 | Lee | H04N 23/951 |
| 2019/0141299 | A1* | 5/2019 | Siddiqui | H04N 25/13 |
| 2019/0182449 | A1* | 6/2019 | Baek | H04N 25/441 |
| 2020/0351444 | A1* | 11/2020 | Cha | H04N 23/68 |
| 2020/0396442 | A1* | 12/2020 | Shin | H04N 25/00 |
| 2021/0390747 | A1 | 12/2021 | Feng et al. | |
| 2021/0409623 | A1* | 12/2021 | Jang | H04N 25/46 |
| 2023/0018004 | A1* | 1/2023 | Wen | G06T 5/73 |

OTHER PUBLICATIONS

Clear Image Zoom, Sony support, 2022, 2 pages, found on the internet at: https://www.sony.com/electronics/support/articles/00021551.

CP's Smooth Zoom Camera, 1 page, found on the internet at: https://corephotonics.com/technologies/smooth-camera-transition/.

Morpho Smooth Zoom, 5 pages, found on the internet at: https://www.morphoinc.com/en/technology/szoom.

Periscope Continuous Zoom Lens, Sony, 49 pages, found on the internet at: https://www.sony-asia.com/electronics/smartphones/xperia-1m4#/Videography:~:text=True%20optical%20zoom%20lens%20with%20no%20image%20degradation.

* cited by examiner

SMOOTH ZOOM TRANSITION IN HIGH RESOLUTION SENSORS

BACKGROUND

The following relates to camera zoom features, and more specifically to smooth camera zoom operations using multiple processing pipelines.

Cameras use a light sensitive device, also referred to as an imaging sensor, to capture the optical image at an image plane. The camera takes the points in the world and projects them onto the 2D sensor plane, as an image. Digital zoom uses a primary image that is produced by the camera optics on the imaging sensor, and can, for example, either crop the image and thereby reduce the image resolution or crop the image and then interpolate or upscale the image. Oversampling involves utilizing a higher resolution image sensor than the camera output image resolution. Oversampling sensors can combine the information from multiple adjacent pixels into one larger pixel on a fixed size sensor. This is also referred to as pixel binning. However, as the pixel size of image sensors becomes smaller, the full-well capacity (i.e., the maximum photon-electrons a pixel can hold) is reduced, which can result in a lower signal-to-noise ratio (SNR). Many smartphones utilize sensors having a higher resolution than the display resolution. A 1-to-1 mapping would transfer one sensor pixel to one display pixel. Down-sampling is the reduction in spatial resolution, while keeping the same two-dimensional (2D) representation.

SUMMARY

Embodiments of the present disclosure provide a zoom operation for digital cameras that can progress through zoom factors and generate an output image with a desired resolution without generating jittery zoom transitions and/or image artifacts.

Approaches for a zoom operation without generating jittery zoom transitions and/or image artifacts can include applying weights to image data for two image processing pipelines during zoom operations and adjusting the weights during the zoom operation.

A method, apparatus, non-transitory computer readable medium, and system for zoom operations are described. One or more aspects of the method, apparatus, non-transitory computer readable medium, and system include obtaining first sensor data and second sensor data. The aspects further include processing the first sensor data using a first processing mode to obtain first image data, wherein the first processing mode is based on a first pixel pattern. The aspects further include processing the second sensor data using a second processing mode to obtain second image data, wherein the second processing mode is based on a second pixel pattern different from the first pixel pattern, and generating an image by combining the first image data and the second image data.

A method, apparatus, non-transitory computer readable medium, and system for zoom operations are described. One or more aspects of the method, apparatus, non-transitory computer readable medium, and system include obtaining first sensor data and second sensor data that is spatially aligned with the first sensor data; processing the first sensor data and the second sensor data based on a first color filter pattern and a second color filter pattern, respectively, to obtain first image data and second image data; and generating an image by combining the first image data and the second image data.

An apparatus and system for camera zoom operations are described. One or more aspects of the apparatus and system include an image sensor configured to obtain first sensor data and second sensor data. One or more aspects of the apparatus and system further include one or more processors, and a memory including instructions executable by the one or more processors. One or more aspects of the apparatus and system further include a first processing pipeline configured to process the first sensor data using a first processing mode to obtain first image data, wherein the first processing mode is based on a first pixel pattern. One or more aspects of the apparatus and system further include a second processing pipeline configured to process the second sensor data using a second processing mode to obtain second image data, wherein the second processing mode is based on a second pixel pattern different from the first pixel pattern, and a merge component configured to combine the first image data and the second image data to obtain combined image data.

DETAILED DESCRIPTION

Principles and embodiments of the present invention generally relate to a high resolution camera system and a method for zooming the camera with smooth transitions between zoom factors and processing pipelines. An applied weight distribution can be a function of a zoom factor.

In one or more embodiments, multiple components, including, region-of-interest (ROI) over-sampling, dual processing, and zoom dependent merging can be utilized.

In various embodiments, an image signal processing (ISP) system configured to employ a plurality of image formats (e.g., CFA formats, binning formats) with dedicated processing pipelines, that can be either independent or overlapping, is provided. Several image formats can be supported on a single oversampled Bayer sensor. Temporal discontinuities in the image signal source and/or processing route can be mitigated in the camera system.

In one or more embodiments, a higher resolution sensor can be used to provide information for a lower resolution output image, where during image capture, a user can choose to "zoom in" or "zoom-out", with the amount of oversampling reduced until the screen/viewfinder is showing just the information from the pixels on the sensor. Resolution is pixels per inch. Digital zoom crops the image to define a selected portion of the image, and then digitally enlarges the size of the selected portion to narrow down the apparent angle of view of the image. In contrast, interpolated zoom is achieved by cropping a window in a standard resolution picture and enlarging the window by interpolation. Upscaling adds pixels using interpolation to increase an image size. Although the number of pixels in the region of interest may be changing, the total number of pixels in the output image, as determined by the display resolution or a video standard size (e.g., 4K, 8K), remains constant regardless of the zoom factor. That is "digital zoom" produces an image that may physically have more pixels for each detail, but doesn't contain any new information compared to the captured image.

Figure 1:
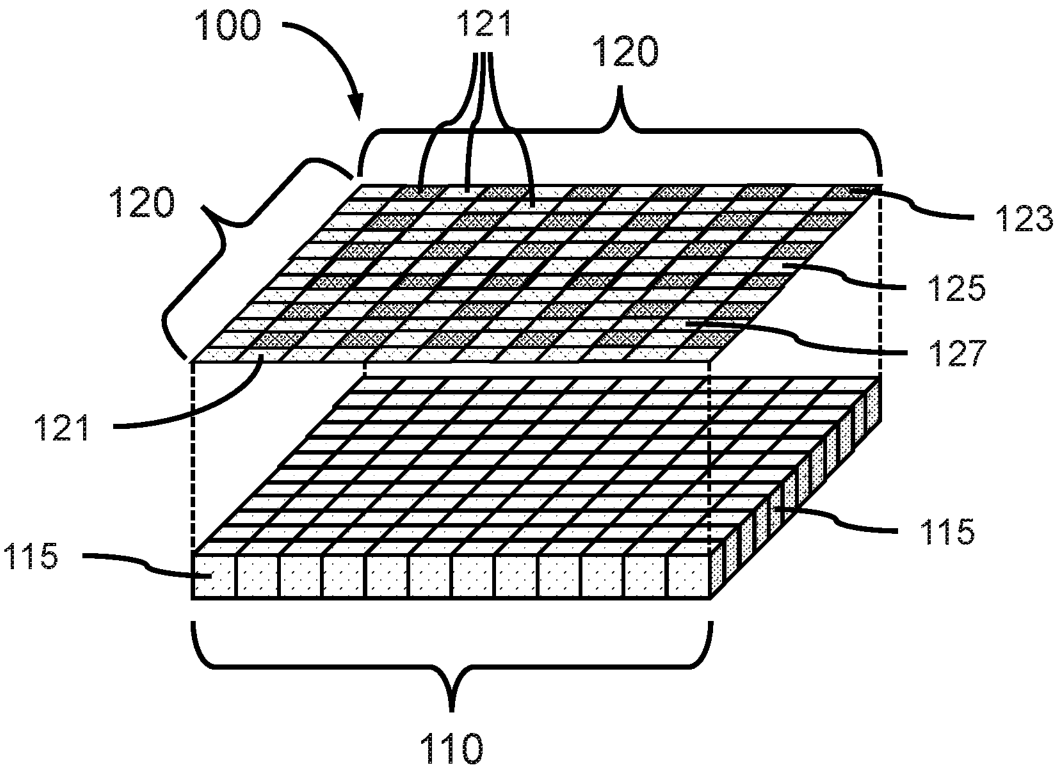
FIG. 1 is an illustrative depiction of a color filter array and a light sensor, according to aspects of the present disclosure.

FIG. 1 is an illustrative depiction of a color filter array and a light sensor, according to aspects of the present disclosure.

In various embodiments, a color image sensor 100 can include an active pixel sensor (APS) 110 forming the light sensitive area of the image sensor, where the active pixel sensor 110 can be divided into individual light collecting cells 115. The light collecting cells 115 can be used to capture the light for the pixels forming an image, where the APS would be color insensitive. The active pixel sensor 110 may be, for example, a charge coupled device (CCD) or a complementary metal-oxide-semiconductor (CMOS) device. The active pixel sensor 110 can be a high-resolution sensor that can zoom in on a desired region of interest (ROI) on the APS. The light collecting cells 115 have a fixed size depending on the image sensor design.

In various embodiments, the color image sensor 100 can include a color filter array (CFA) 120 over the active pixel sensor 110, where the color filter array 120 can have a plurality of color filters 121 that determine the different wavelengths of light impinging on an underlying light collecting cell 115. The color filter array 120 can determine the wavelength range of light recorded by each light collecting cell 115, where the CFA can have a predetermined pattern of different colors.

In various embodiments, the light collecting cells 115 of the active pixel sensor 110 can have 1-to-1 relationship with a color filter 121 of the color filter array (CFA) 120, a 4-to-1 relationship with a color filter 121 of the CFA 120, a 3-to-1 relationship with a color filter 121 of the CFA 120, or a 4-to-1 relationship with a color filter 121 of the CFA 120, although other relationships are also contemplated, where the relationship of the color filters to the light collecting cell 115 can determine a color filter pattern for a collected image.

In various embodiments, the color filter array 120 can be a Bayer color filter array, where the different color filters 121 include a red color filter 123, two green color filters 125, and a blue color filter 127 having an alternating pattern with green color filters arranged diagonally across each row and column of the array, and blue color filters 127 and red color filters 123 arranged diagonally in alternating rows and columns of the array. In various embodiments, the sensor can be an oversampled-Bayer sensor (e.g., $Tetra^2$/Nona/Tetra).

In various embodiments, the color filters 121 can be of different colors forming a different color filter array 120, for example, a RYYB filter with one red filter, two yellow filters, and a blue filter, a CYGM filter with one cyan, one yellow, one green, and one magenta filter, etc., although other color filter arrays are also contemplated. The color filters 121 can be arranged in different patterns depending on the color filter design and implemented filter colors.

In various embodiments, the color filters 121 of the color filter array 120 can be larger than the light collecting cells 115 of the active pixel sensor 110, such that a 2×2, 3×3, or 4×4 array of adjacent light collecting cells 115 share the same color filter color and thereby collect light of the same color, or each light collecting cell 115 can have its own color filter 121, where the 1×1, 2×2, 3×3, or 4×4 array of light collecting cells 115 have a color filter of the same color.

In various embodiments, the light received from an object external to the camera system passes through the color filter array 120 and impinges on the active pixel sensor (APS) 110, where the light intensity impinging on each light collecting cell 115 is attenuated based on the associated color filter 121. The collected light generates an electric signal in the light collecting cells 115, that can produce a digital image of the external object, where the APS can be on an image plane.

Figure 2:
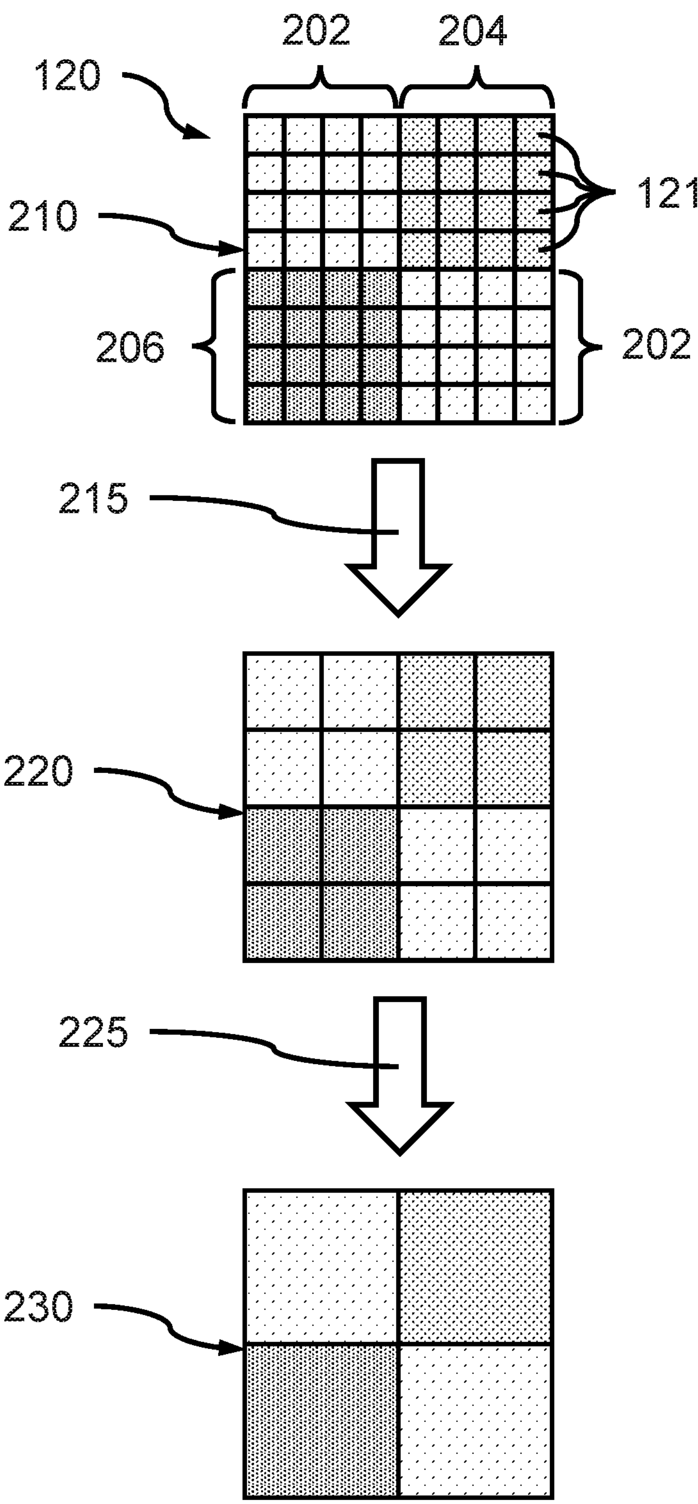
FIG. 2 is an illustrative depiction of color filter array formats with binning, according to aspects of the present disclosure.

FIG. 2 is an illustrative depiction of color filter array formats with binning, according to aspects of the present disclosure.

In various embodiments, the color filter array 120 can be a Bayer color filter array having two green filters 202, as illustrated with less dense stippling, one red filter 204, as illustrated with intermediate density stippling, and one blue filter 206, as illustrated with more dense stippling. In various embodiments, a 4×4 array of color filters 121 can be of the same color in the CFA, and the associated 4×4 array of light collecting cells 115 can collect information for the same color. The binning can be conducted without demosaicing. In various embodiments, a re-mosaic algorithm can remap pixels into a Bayer RGB pattern. Each pixel may have only one color intensity value (either R, G or B), whereas if demosaicing were applied, each pixel would have values for all three colors. In various embodiments, 16 color filters of the same color arranged in a 4×4 square can be utilized for the color filter for an APS 110.

In various embodiments, the oversampled light collecting cells 115 (i.e., sensor pixels) can be combined in a predetermined manner to sum the electric signal through binning 215, 225. A way to effectively change sensor pixel size is to combine pixels into larger binned-pixels, through a process known as binning. Binning 215, 225 the signals from an array of light collecting cells 115 of a predetermined size and resolution can increase the signal and reduce the signal-to-noise ratio (SNR), but results in a loss of spatial resolution. However, due to a high resolution of the APS 110 and oversampling of the received image, the displayed image can remain visually clear. Zooming can be accomplished by displaying the sensor pixels from the region-of-interest at a pre-defined output resolution.

In various embodiments, a color filter pattern can determine a relationship between sensors, a color filter array, and an output image based on the resolutions of the color filter array and APS. The color filter pattern can include a 4×4 array of sensor pixels 210 corresponding to a color filter for each color (e.g., a $Tetra^2$ pattern), a 2×2 array of sensor pixels 220 to a color filter for each color (e.g., a Tetra pattern), and a 1×1 array of sensor pixels 220 to a color filter (e.g., a Bayer pattern). Other pattern can include a 3×3 array of sensor pixels 220 to a color filter, that can be referred to as a Nona pattern.

In various embodiments, binning 215 can modify the color filter pattern with the 4×4 array of sensor pixels 210 to a color filter pattern with the 2×2 array of sensor pixels 220. Pixels forming the color filter pattern with the 2×2 array of sensor pixels 220 can be further binned 225 to form a color filter pattern with the 1×1 array of sensor pixels 230. The binning can be controlled by software that determines the output resolution and the input resolution depending on the color filter pattern.

For example, a High Resolution (HR) zoom can provide a zoom factor for a user to control resolution of an image by electronically cropping (or windowing) a sensor area detecting an optical image, digitizing a resulting electrical image to a digital, electronic image, and down-sampling (binning) the digital image to a final resolution. The number of pixels used to display a region of interest (ROI) may be changing during a digital zoom operation. However, unlike an optical zoom feature, a digital zoom may not always remain sharp during zoom-in and zoom-out operations. This can be due to a loss of information in the processing pipelines.

Digital zoom limitation(s) can result from having a specific sampling rate because once the image is sampled with/at the specific sampling rate new information may not be generated beyond that rate. The sampling rate may be predetermined at a specific value (e.g., ×1, ×2, ×4, etc.), where the sampling rate may be selected based on an intended output resolution. The image, however, may be spatially oversampled, where oversampling the image can retain more detail. The resolution can be digitally adjusted in the sensor to provide a desired zoom factor through a dual pipeline to provide continuity in the image quality.

In various embodiments, a video stream can be streamed out of the image processing system (either in video capture or during preview) at a pre-defined output resolution.

In a non-limiting exemplary embodiment, the output resolution (e.g., display screen, or standard image/video format (e.g., 4 k, 8 k, etc.)) can be 12 Megapixels, where a video sequence can begin at ×1 zoom factor, where the entire APS 110 can be used to capture the region of interest. The target resolution can be achieved using double binning (e.g., Tetra$^2$-to-Bayer), where 16 light collecting cells 115 or pixels can be combined to form a single pixel of a predetermined color for remosaicing/demosaicing and display. Binning can reduce the total amount of data presented and affect aliasing due to sub-sampling, where binning combines the collected signal from multiple sensor element together to form a binned set.

The high image resolution available in an active pixel sensor (also referred to as an optical sensor array) can provide for the acquisition of raw image data with a resolution significantly higher than standard video resolution, which can provide high resolution zoom. For example, an intended 12 megapixel (Mpxl) output resolution can be generated from a 192 Mpxl sensor to form an image with a size of 4000×3000 pixels (12 Mpxl). The sensor pixel size can be changed by combine pixels into the larger binned-pixels, through binning. For example, with a 2×2 bin, a square array of 2×2 (4) pixels are read out by the camera as if they were a single pixel. The spatial resolution is halved in each direction, but the sensitivity is increased by a factor of 4, where the well capacity of the binned-pixel is 4× that of a single sensor pixel, so the dynamic range is subsequently higher. Binning an entire camera sensor's pixel grid into 2×2 groups will reduce the image resolution by a factor of two and the total number of effective pixels by a factor of four. But in return, a binned-pixel is effectively four times as sensitive to light. The camera's internal processor can sample surrounding pixels to interpolate full RGB color data for each pixel in a process called demosaicing.

To enable color cameras to pixel bin more effectively, camera sensors can have an entire grid of filters rearranged into a pattern called a quad-Bayer array (also referred to as quad-pixels). In this pattern, each 2×2 group is the same color, forming a larger Bayer pattern with four pixels in each binned-pixel. In this manner, when the camera bins each 2×2 group of sensor pixels, the color data can be preserved and the image of binned-pixels demosaiced like a standard Bayer filter image. With a quad-Bayer array, each of the four pixels in a binned-pixel can have different exposure settings, allowing up to four images with different exposures, but of the same color, to be taken simultaneously. Processing the sensor pixels in such arrays, however, can involve a more complicated demosaicing algorithm. The sensor pixels with the same color filter next to each other in a 2×2 pixel array can be grouped and the pixels merged to create a larger artificial RGB pixel array for collecting more light.

In various embodiments, a high-resolution image sensor can utilize an oversampled Bayer CFA that allows for multiple Readout (RO) formats at different predefined spatial resolutions. For example, a Tetra$^2$ 192 Megapixel sensor in a full resolution mode can read out a Tetra$^2$ format 210, but at a lower resolution, such as 48 Mpxl, the sensor can use binning to provide a smaller readout image in a Tetra format 220. When the intended display resolution is further reduced, the sensor can use additional binning to provide a 12 Mpxl image in a Bayer format 230.

For example, in a zoom operation, where a video stream is streamed out of the system (either in video capture or during preview) at a pre-defined output resolution, the entire APS can be used for the ROI and the target output resolution can be achieved by using double binning (e.g., Tetra$^2$-to-Bayer). A further increase of the zoom factor by a user, for example, to ×1.5, can reduce the ROI to a smaller part of the APS, while the output resolution is kept the same. However, due to the zoom factor, binning to Bayer output may not be sufficient to achieve the intended resolution, so one of the following two operations may occur:

- In various embodiments, double binning can be used to obtain a Bayer output, and the Bayer output upscaled to achieve the intended output resolution; or
- the read-out can be set to Tetra resolution (by performing single binning) and the output resolution down-scaled to achieve the intended output resolution.

In various embodiments, the first option may be utilized for small zoom factors, and a transition to the second option using a higher resolution readout (RO) may be utilized near the ×2 zoom factor. The options may also be utilized for other zoom factors and ranges.

Figure 3:
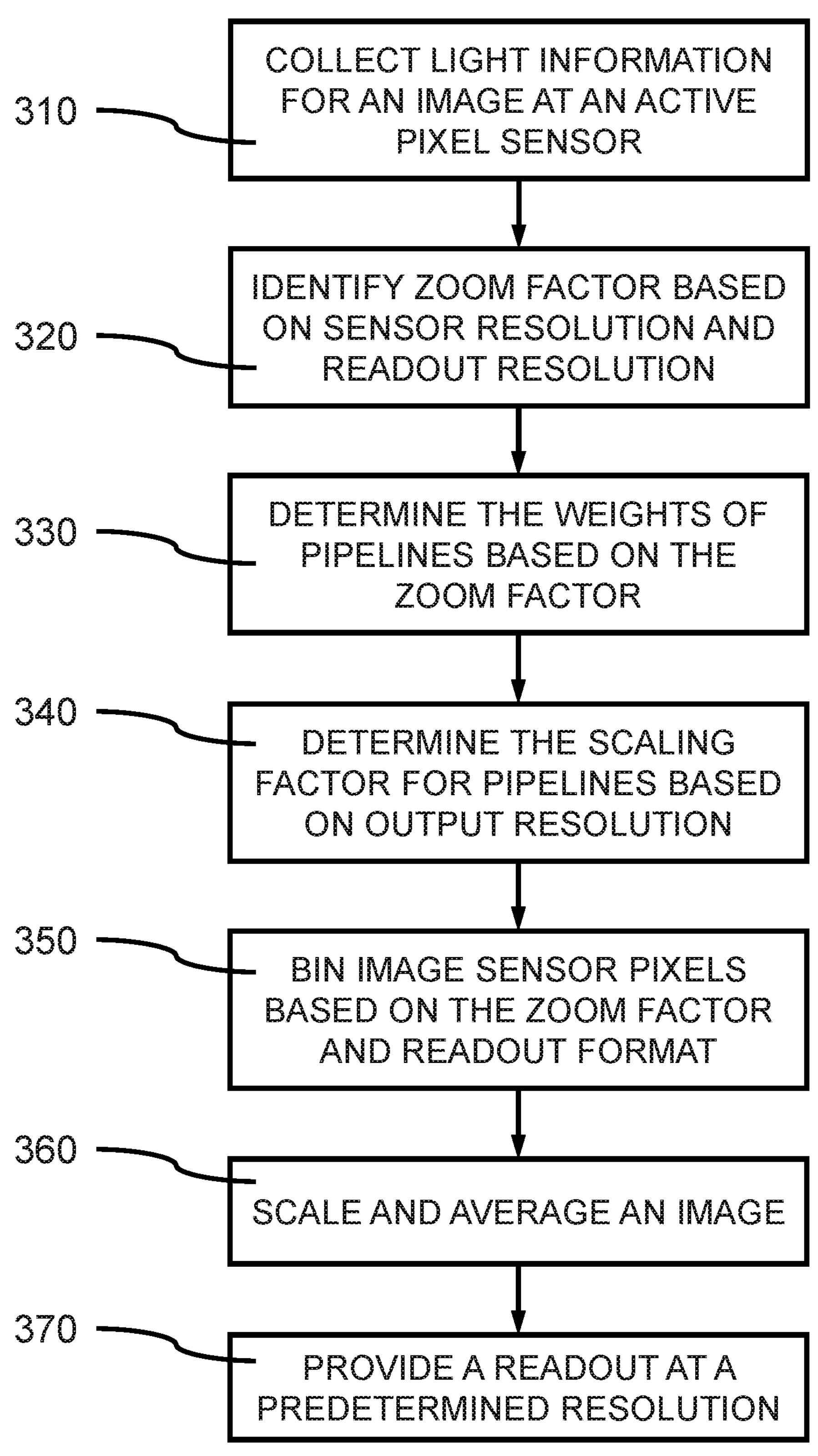
FIG. 3 is an illustrative depiction of a high-level block/flow diagram showing a method for a digital zoom process with binning, remosaicing, and scaling, according to aspects of the present disclosure.

FIG. 3 is an illustrative depiction of a high-level block/flow diagram showing a method for a digital zoom process with binning, remosaicing, and scaling, according to aspects of the present disclosure.

In one or more embodiments, an image captured by an active pixel sensor (APS) can be provided to the image signal processing (ISP) system, where the APS and the image captured by the APS can have a predetermined spatial resolution (e.g., 192 Mpxl). A zoom factor can be determined by the user and received by the ISP system. The captured image can be fed to one or more image processing pipelines based on the received zoom factor, where the image can be binned, remosaiced (e.g., from Tetra/Tetra$^2$ to Bayer), and scaled. "Remosaicing" can use image processing to approximate the use of a Bayer color filter.

At operation 310, light information, including, light intensity, color, spatial location on the image plane, etc., can be collected by an active pixel sensor. The APS can have a predetermined spatial resolution, and capture a visual image at a plurality of light collecting cells having a predetermined size (e.g., 0.9 micrometers (um)).

In various embodiments, the light intensity and color collected by the active pixel sensor can be affected by a CFA.

At operation 320, a zoom factor can be identified, where the zoom factor can be based on the sensor resolution and the readout resolution. The vertical and horizontal image size in pixels can be divided by zoom factor to obtain a new number of vertical and horizontal pixels for the readout.

For example, to zoom an image of M pixels wide by a factor "z" around coordinate C and targets an N pixels wide image, then the corresponding mapping for x-coordinates can be [−0.5, N−0.5]↦ [C−M/2z] over {0, . . . , N−1}.

That is, $$x \in \left\{ n = 0, \ldots , N-1 \;\middle|\; \frac{M}{zN}\left(n - \frac{N-1}{2}\right) + C \right\}.$$

The x coordinates together with the corresponding y-coordinates can be used for interpolating the image within the intended region of interest.

In various embodiments, the region of interest can be oversampled at a lower binning factor than would otherwise be used to obtain the intended output resolution. For example, for a 192 Mpxl sensor with an intended 12 Mpxl output resolution, the APS can provide output with a binning factor of ×4, but with output at a zoom-factor of ×2 (48 Mpxl) resolution. This can allow a further downscaling of the image in the digital domain, while preserving the higher resolution involved in finer zoom transitions.

In various embodiments, the maximum binning factor is calculated for each downscaling (DS) factor. The maximal binning factor may subsequently be reduced by the smaller available increment (e.g., from ×4 to ×2) to provide high-resolution image information.

At operation 330, weights to assign the image information to different pipelines can be determined based on the zoom factor, where the zoom factor affects the extent of binning to be performed. In various embodiments, a plurality of weights can be applied to the image based on the current zoom factor, where the current zoom factor can determine the pipeline(s) involved in processing the image data.

In various embodiments, to gradually change from an image, $Im_1$, to an image, $Im_2$, (e.g., from ×4 to ×2) during a zoom operation, $z=z_1$ to $z=z_2$, the weights can be calculated as:

$$w_1(z) = \frac{\log(z) - \log(z_1)}{\log(z_2) - \log(z_1)},\; w_2(z) = 1 - w_1(z).$$

In various embodiments, the weights can be linear on a logarithmic scale, where the zoom factor is multiplicative.

At operation 340, a scaling factor can be determined for the pipelines based on the intended output resolution. The scaling factor for each pipeline can be determined from the zoom factor to generate the intended output resolution. First image data can be scaled based on a first scaling factor to obtain first scaled image data, and second image data can be scaled based on a second scaling factor to obtain second scaled image data. Third image data can be scaled based on a third scaling factor to obtain third scaled image data.

At operation 350, the image sensor pixels can be binned based on the zoom factor and a readout format.

For example, assuming a 16K×12K=192 Mp sensor is a 60 degree sensor, where a 50 degree foV is desired after zoom at a resolution of 4K×3K=12 Mpxl:

$Im_1$ is the ×4 bin image (Bayer) of resolution 3,333×2500 and the (up-)scale factor to the intended 12 Mp=4000/3,333=6/5.

$Im_2$ is the Tetra image of resolution 6,666×5000 and the (down-)scale factor to the intended 12 Mp=4000/6,666=3/5.

In various embodiments, the scale factor per image can be desired_line_width/image_line_width, or calculated with column lengths, while having the aspect ratio conserved.

At operation 360, the image can be scaled and averaged with other images to obtain an output image in a way that smoothly transitions between the zoom factors.

At operation 370, a readout can be provided at the predetermined resolution. An output image can be provided to a user, where the output image has a lower spatial resolution than the original captured image and the APS. The number of pixels in the output image can be a multiple of the number of pixels in the APS. In various embodiments, a readout image can be generated by combining first scaled image data and second scaled image data, or combining first scaled image data, second scaled image data, and third scaled image sensor data.

Figure 4:
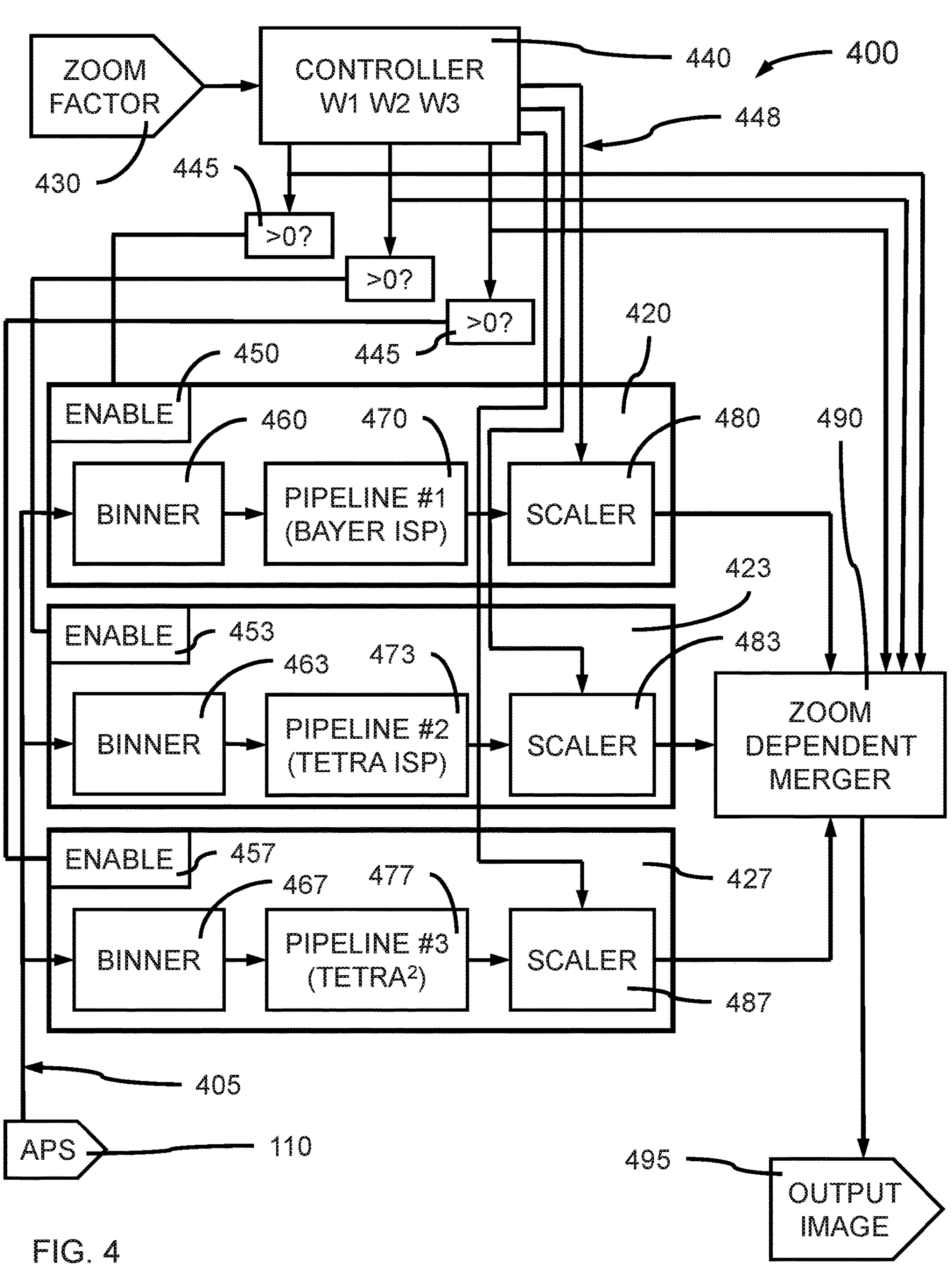
FIG. 4 shows a block diagram of a multipipeline image processing system, according to aspects of the present disclosure.

FIG. 4 shows a block diagram of a multipipeline image processing system, according to aspects of the present disclosure.

In one or more embodiments, image information can be provided as an electrical signal from an active pixel sensor (APS) 110 and communicated 405 to a plurality of processing pipelines 420, 423, 427. In various embodiments, each processing pipelines 420, 423, 427 can receive the image information, where each processing pipeline can provide a separate processing mode. The processing pipelines 420, 423, 427 can utilize electrical and electronic circuitry configured to process image sensor data using one or more processing modes. The image information can be assigned to one or more of the processing pipelines 420, 423, 427 based on a zoom factor, where the assignments may be based on weights calculated based on the zoom factor. The image information can be assigned to one or more of the processing pipelines through an enable feature 450, 453, 457, that can activate a pipeline to receive the image information.

In various embodiments, the image format that is read from the APS 110 can undergo a dedicated image signal processing (ISP) route in order to be usable, where the ISP routes can be different for the different formats (e.g., the Bayer format may only involve bad-pixel-correction (BPC), while Tetra may also involve remosaicing). The dedicated ISP route can be implemented as separate processing pipelines 420, 423, 427, where each processing pipeline can have circuitry configured to execute a processing mode for an ISP route. A processing mode can involve hardware and/or software to process image data received from the APS 110. Because the processing along an ISP route can have a detrimental impact on the image character, the transition between the ISP routes and pipelines can be visible and cause jittery and inconsistent image/video quality.

In various embodiments, a zoom factor 430 can be received by an image signal processing controller (ISPc) 440, where the zoom factor can determine which processing pipeline would be implemented for the image at a current zoom factor. Changes in the zoom factor 430 can cause transitions and overlap between the processing pipelines 420, 423, 427.

In various embodiments, the ISPc 440 can be a zoom dependent controller that determines the weights applied to the image for each pipeline based on the zoom factor. The ISPc may also take other considerations into account, such as power, zoom factor stability, and desired 'steady-state' weights. The ISPc 440 can also determine a scaling factor 448 employed for each pipeline to meet the intended output resolution, where the scaling factor 448 can be communicated to a scaler 480, 483, 487 associated with a processing pipeline 420, 423, 427. A threshold 445 may be used to determine the processing pipelines 420, 423, 427 activated to process the image at a current zoom facto. The threshold 445 can be compared to the current zoom factor to make a determination of the pipeline(s) to be used, where the thresholds 445 can be predetermined. The thresholds 445 can be a zoom factor.

In various embodiments, the ISPc 440 may disable unrequired pipelines through the enable feature 450, 453, 457, to save power. By disabling a pipeline when the associated processing mode is not being utilized, the power consumption by the image signal processing (ISP) system 400 can be reduced. For example, where three processing pipelines are available, one or two pipelines may be disabled. For each processing pipeline 420, 423, 427, and processing mode, the image can be binned appropriately, processed, and scaled to the desired output resolution, where a scaling factor 448 can be calculated by the ISPc 440. The scaled images can then be averaged by a zoom dependent merger 490 according to weights determined by the ISPc 440.

In various embodiments, because the image signal processing (ISP) system 400 can process each image format individually, a 'binning' copy of the readout (RO) image can be generated by a binner 460, 463, 467, and both the original RO image and the digitally binned image can be streamed through the respective processing pipelines 420, 423, 427. By forming a copy of the RO image, two images of the same scene and the same field of view can be provided at different resolutions from different processing pipelines, where one image can be over-resolved and one image can be under-resolved. Both images may then be scaled to the intended output resolution.

In various embodiments, the Bayer ISP pipeline 470 can generate an image applying bad-pixel-correction (BPC), smoothing functions, and/or sharpening functions. The Bayer ISP pipeline 470 may not change the resolution of the image, where resolution manipulations can instead be done by the binner 460 and scaler 480.

In various embodiments, the Tetra ISP pipeline 473 can generate an image applying a remosaicing and/or BPC, where a Bayer image can be generated in the same field-of-view (FOV) and resolution as the input Tetra image. The resolution manipulations can be done by the binner 463 and scaler 483.

In various embodiments, the Tetra$^2$ ISP pipeline 477 can generate an image applying a remosaicing and/or BPC. The resolution manipulations can be done by the binner 467 and scaler 487.

In the non-limiting exemplary embodiment of the 192 Mpxl sensor and a desired 12 Mpxl output resolution with a zoom factor of ×1.6, a readout of the sensor with ×2 binning can generate an image with a size of 5000×3750 pixels. This image can be processed through a Tetra pipeline preserving the resolution, and can be simultaneously digitally binned by ×2 (down to 2500×1875) and processed by a Bayer pipeline. This will result in 2 images with resolutions of 18.75 Mpxl and ~4.7 Mpxl, which can be scaled down and up, respectively, to generate two 12 Mpxl images through the two different pipelines. The scale factor for each pipeline would be determined by the controller from the zoom factor.

In various embodiments, a mapping technique may be used to keep the resized images aligned, where each target pixel can be mapped to a coordinate in subpixel resolution on the source image. The value can be calculated through interpolation. For maintaining physical alignment, the mapping can be considered a "pixel-is-area." For example, to zoom an image of M pixels wide by a factor "z" around coordinate C and targets an N pixels wide image, then the corresponding mapping for x-coordinates can be [−0.5, N−0.5]$\mapsto$ [C−M/2z] over {0, . . . , N−1}.

That is, $$x \in \left\{ n = 0, \ldots, N-1 \;\middle|\; \frac{M}{zN}\left(n - \frac{N-1}{2}\right) + C \right\}.$$

The x coordinates together with the corresponding y-coordinates can be used for interpolating the image within the intended region of interest.

To provide a smoother appearance, the weight values can be adjusted, where the weight adjustments can be accelerated relative to the zoom factor.

In various embodiments, the particular processing pipeline depends on the specific readout format and properties, where for example, a Tetra RO image would be processed through a Tetra specific image pipeline 423. Dual processing can utilize a control algorithm to enable/disable the processing pipelines during the zoom variation process.

In various embodiments, disabling one or more processing pipelines that are not in current use can reduce the power consumption.

In contrast, making use of a degenerate processing pipeline control that maps each zoom factor to a specific pipeline (Bayer/Tetra/Nona/Tetra$^2$/etc.) can result in jittery abrupt changes at particular zoom factors during zoom transitions, where degeneracy is the ability of each pipeline that is structurally different to perform the same function or yield the same output.

In various embodiments, a control algorithm can gradually shift the weights to one processing pipeline, thus smoothing the transition between pipelines, and allowing another pipeline to be disabled for power reduction.

A non-limiting exemplary embodiment of such a control algorithm, would be:

$$\frac{dw_i}{dt} = \alpha(w_i^t(z) - w_i)R(t) + \beta(w_i^{s.s.} - w_i)(1 - R(t));$$

where $w_i$ is the weight applied to the image for pipeline i, $$w_i^t(z),\ w_i^{s.s.}$$

are the transient and steady-state weights (respectively) of the i'th pipeline, α, β are tuning parameters, R(t) is a rectification function of the total-recent-variation TRV(t), and TRV(t) is a measure of the total recent variation of the zoom factor, z(t), as a function of time.

In various embodiments, R(t) and TRV(t) can be:

$$R(t) = \begin{cases} 0 & TRV_m > TRV(t) \\ \frac{TRV(t) - TRV_m}{TRV_M - TRV_m} & TRV_M > TRV(t) > TRV_m \\ 1 & TRV(t) > TRV_M \end{cases};$$

with $TRV_m$, $TRV_M$ as the minimal and maximal values for TRV(t); and $$TRV(t) = \int_{t-T}^{t} \left(\frac{dz}{dt}\right)^2$$

dt with T being some predefined time window (recent) and z(t) being the zoom factor.

Such a system can provide both a smooth transient weight distribution during the zoom change and an optimized weight distribution (where optimization can target either power or image quality).

In various embodiments, several considerations may control how the weight(s) would be determined. With 3 separate pipelines (e.g., Bayer/Tetra/Tetra$^2$) applied to 3 specific zoom factors (e.g., ×4/×2/×1 respectively) the weights from two pipelines can be combined based on applied weights for other zoom factors. For example, a weight that reflects the vicinity to a specific zoom factor is $w_{ss}$. In the case where the zoom factor is fixed (i.e., doesn't change over time) the weight $w_i$ will approach $w_{ss}$.

In various embodiments, where the zoom factor is changing over time (e.g., the user keeps zooming in and out) rapid changes in the zoom factor may be mitigated in order to provide a smooth video using $w_t$ and R(t), where $w_t$ and R(t) can adjust the weight towards the instantaneous weight $w_t$. Having the change in $w_i$ be controlled by these two forces through its derivative can cause the weight to change smoothly.

In various embodiments, digital binning, scalers, a zoom dependent controller, and a zoom dependent merger can be provided.

In one or more embodiments, three components, including, ROI over-sampling, dual processing and zoom dependent merging can be utilized. In various embodiments, the processing chain (either on the sensor or on a connected processor) contains dedicated processing pipelines for each of the image formats that the APS supports. In various embodiments, to perform zoom from a single camera the field of view (FOV) can be under-sampled. The image can be processed using a specific appropriate pipeline determined by a zoom factor, and the result can be upscaled to a predetermined resolution. In various embodiments, a smooth zoom transition with no abrupt transitions from one pipeline to another during the zoom operation may be obtained.

In various embodiments, artifacts (e.g., changes in sharpness, granularity, smoothness, false color, color shift, false detail, worms, jaggedness, etc.) can be masked between one pipeline to the others. The artifacts may be caused by specific implementations of different remosaicing and BPC within each pipeline. Because each pipeline has different implementations of these operations, the artifacts can be different between the pipelines, where the averaging of several pipelines can cover-up the artifacts to some extent.

Figure 5:
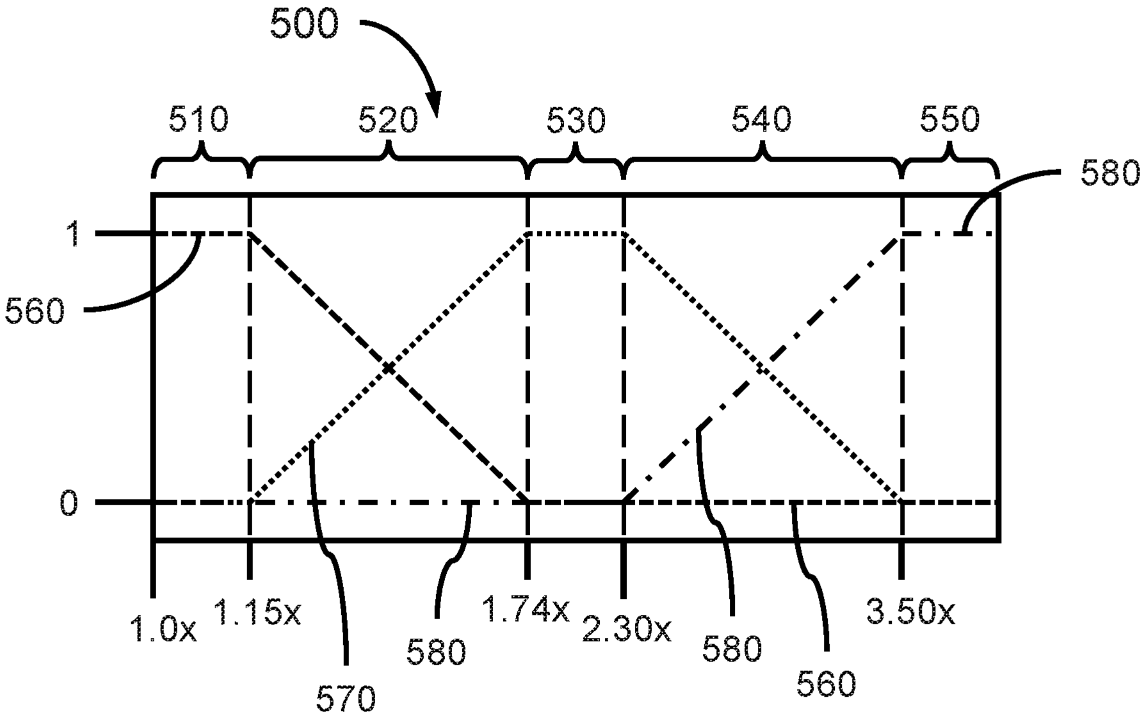
FIG. 5 shows a graph of a weight distribution of Bayer ($w_1$), Tetra ($w_2$) and Tetra$^2$ ($w_3$) images as a function of the zoom factor, according to aspects of the present disclosure.

FIG. 5 shows a graph of a weight distribution of Bayer ($w_1$), Tetra ($w_2$) and Tetra$^2$ ($w_3$) images as a function of the zoom factor, according to aspects of the present disclosure.

In various embodiments, a control algorithm utilizing a weighted averaging of the pipelines can be employed to adjust the transition between two processing modes and pipelines. The weights $w_i$ can be determined by the zoom factor in a way that changes gradually between processing modes, such that there can be a smooth transition between, for example, the Bayer and Tetra pipelines for zoom factors between about ×1 and about ×2, respectively, where the parameters of the system may determine the transition thresholds, and where there can also be a transition between Tetra and Tetra$^2$ for zoom factors between about ×2 and about ×4, respectively, where the parameters of the system may determine the transition thresholds. The processing pipeline used for the processing mode depends on the specific readout format and properties. Using dual processing modes involves the control algorithm configured to enable/disable the processing pipelines during the zoom variation process.

In various embodiments, a graph illustrates the weighted contribution of images having different processing modes and binning formats to a combined image. The graph 500 of weighted contributions can have a plurality of regions 510, 520, 530, 540, 550 representing the contribution from each image of different binning formats and resulting resolutions being combined to an output image. The weights can be indicated on the y-axis in a range of from 0 to 1, where 0 indicates no contribution and 1 represents 100% contribution. The zoom factor can be indicated along the x-axis, where a larger value indicates a greater zoom.

In various embodiments, an image can provide 100% of the contribution to an output image up to a predefined zoom factor, for example, 1.15×, where the image can have a predetermined binning format (e.g., Bayer ($w_1$), Tetra ($w_2$) and Tetra$^2$ ($w_3$)). Image sensor data can be binned based on a first binning size (e.g., 4×4, 2×2, 1×1) to obtain first binned image sensor data, where a first processing mode can be applied to the first binned image sensor data. Second image sensor data can be binned based on a second binning size to obtain second binned image sensor data, where the second processing mode can be applied to the second binned image sensor data. The first processing mode and the second processing mode can be based on different color filter arrays.

In various embodiments, a first processing region 510 represent a zoom factor range from a first value to a second value, for example, 1.0 to 1.15, where the first set of image sensor data 560 (e.g., an image) can be processed by a first image processing pipeline. The first image processing pipeline can have first circuitry configured to process the first image sensor data using a first processing mode. A weight of 1 can be applied to the first set of image sensor data 560, and a weight value of 0 can be applied to other sets of image sensor data 570, 580, such that the first set of image sensor data 560 contributes 100% to an output image.

In various embodiments, a second processing region 520 represent a zoom factor range from the second value to a third value, for example, 1.15 to 1.74, where the first set of image sensor data 560 (e.g., an image) can be processed by the first image processing pipeline and a second set of image sensor data 570 (e.g., an image) can be processed by a second image processing pipeline. The second image processing pipeline can have second circuitry configured to process the second image sensor data using a second processing mode. A weight between 1 and 0 can be applied to the first set of image sensor data 560, and a weight value between 0 and 1 can be applied to the second set of image sensor data 570, such that the first set of image sensor data 560 contributes a decreasing amount and second set of image sensor data 570 contributes an increasing amount in an inverse relationship to a combined image for readout.

In various embodiments, a third processing region 530 represent a zoom factor range from the third value to a fourth value, for example, 1.74 to 2.30, where the second set of image sensor data 570 can be processed by the second image processing pipeline. A weight of 1 can be applied to the second set of image sensor data 570, and a weight value of 0 can be applied to other sets of image sensor data 560, 580, such that the second set of image sensor data 570 contributes 100% to the output image.

In various embodiments, a fourth processing region 540 represent a zoom factor range from the fourth value to a fifth value, for example, 2.30 to 3.50, where the second set of image sensor data 570 can be processed by the second image processing pipeline and a third set of image sensor data 580 (e.g., an image) can be processed by a third image processing pipeline. The third image processing pipeline can have third circuitry configured to process the third image sensor data using a third processing mode. A weight between 1 and 0 can be applied to the second set of image sensor data 570, and a weight value between 0 and 1 can be applied to the third set of image sensor data 580, such that the second set of image sensor data 570 contributes a decreasing amount and the third set of image sensor data 580 contributes an increasing amount in an inverse relationship to the combined image for readout.

In various embodiments, a fifth processing region 550 represent a zoom factor range from the fourth value to a fifth value, for example, 3.50 and above, where the third set of image sensor data 580 can be processed by the third image processing pipeline. A weight of 1 can be applied to the third set of image sensor data 580, and a weight value of 0 can be applied to other sets of image sensor data 560, 570, such that the third set of image sensor data 580 contributes 100% to the output image.

In various embodiments, the transition can be linear, where each image being combined can be multiplied by an associated weight value and the calculated values for each image summed.

In various embodiments, the control algorithm can determine that a target parameter is below a first threshold value, and generate a subsequent image using the first processing mode based on the determination.

In various embodiments, the control algorithm can determine that a target parameter is between a first threshold value and a second threshold value, wherein the first image data and the second image data are combined based on the determination.

In various embodiments, the control algorithm can determine that a target parameter is above a first threshold value and above a second threshold value, and generate a subsequent image using the second processing mode based on the determination.

In various embodiments, the control algorithm can refrain from using the first processing mode for the subsequent image based on the determination, where adjusting the weight of the first pipeline to zero can reduce power consumption by disabling the first pipeline.

In various embodiments, the control algorithm can determine that a target parameter is above a first threshold value and a second threshold value and between a third threshold value and a fourth threshold value, and generate a subsequent image using the second processing mode and a third processing mode based on the determination.

In various embodiments, the control algorithm can determine that a target parameter is above a first threshold value, a second threshold value, a third threshold value, and a fourth threshold value, and generate a subsequent image using a third processing mode based on the determination.

In various embodiments, the control algorithm can refrain from using the first processing mode and the second processing mode for the subsequent image based on the determination, where adjusting the weight of the first and second pipelines to zero can reduce power consumption by disabling the first and second pipelines.

In various embodiments, the pipeline weights are gradually changing, and when the zoom finally settles on an intermediate value (e.g., ×3.5) a power preservation feature can become functional and adjust the weight of one or more of the pipelines (e.g., $w_{\times 2}$) to zero can reduce power consumption (e.g., to preserve battery life).

Figure 6:
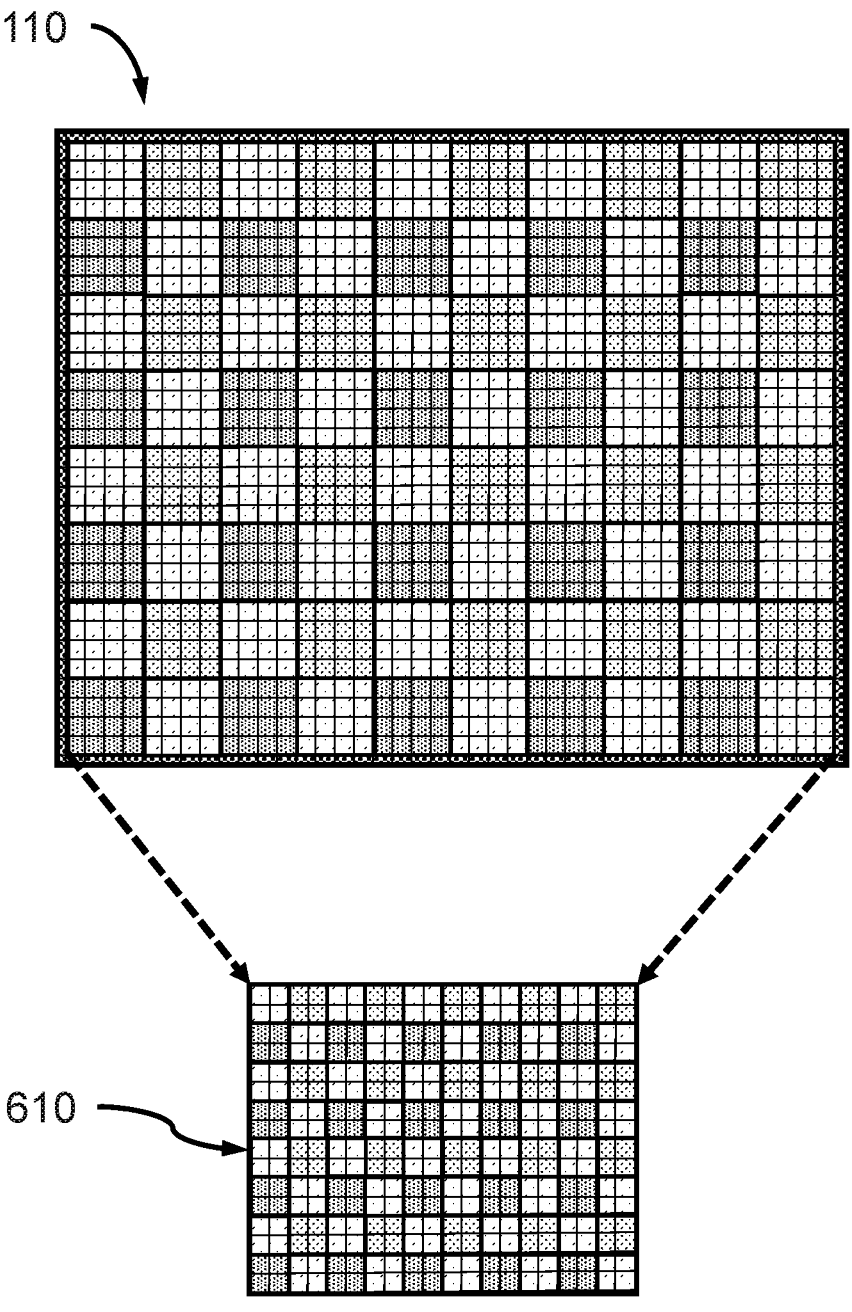
FIG. 6 is an illustration of color filtering and binning, according to aspects of the present disclosure.

FIG. 6 is an illustration of color filtering and binning, according to aspects of the present disclosure.

In a non-limiting exemplary embodiment, an original image collected by an APS 110 using a Tetra$^2$ color filter arrangement with a 4×4 array for each color can be binned and down-sampled to a predetermined readout resolution 610. For example, the 4×4 color filter array can be binned to form 2×2 color pixels for readout, where the APS is depicted with 40×32 pixel resolution and the readout is depicted with 20×16 pixel resolution. Binning the 4×4 color filter array to the 2×2 array reduces the 40×32 resolution of the APS to the 20×16 readout resolution. Because the binned resolution is the same as the readout resolution, there is a 1-to-1 relationship of image pixels to output without up-sampling or down-sampling. The video stream can be streamed out of the system (either in video capture or during preview) at the pre-determined output resolution. At a ×1 zoom factor, the entire APS 110 is used as the ROI and the target output resolution is met by the binning. A further increase in the zoom factor by the user, e.g. ×1.5, reduces the ROI to a smaller part of the APS 110, while the output resolution remains constant. Due to the increased zoom factor, binning is not sufficient to achieve the desired readout resolution, so binning and up-sampling can be used to achieve the desired output resolution.

Figure 7:
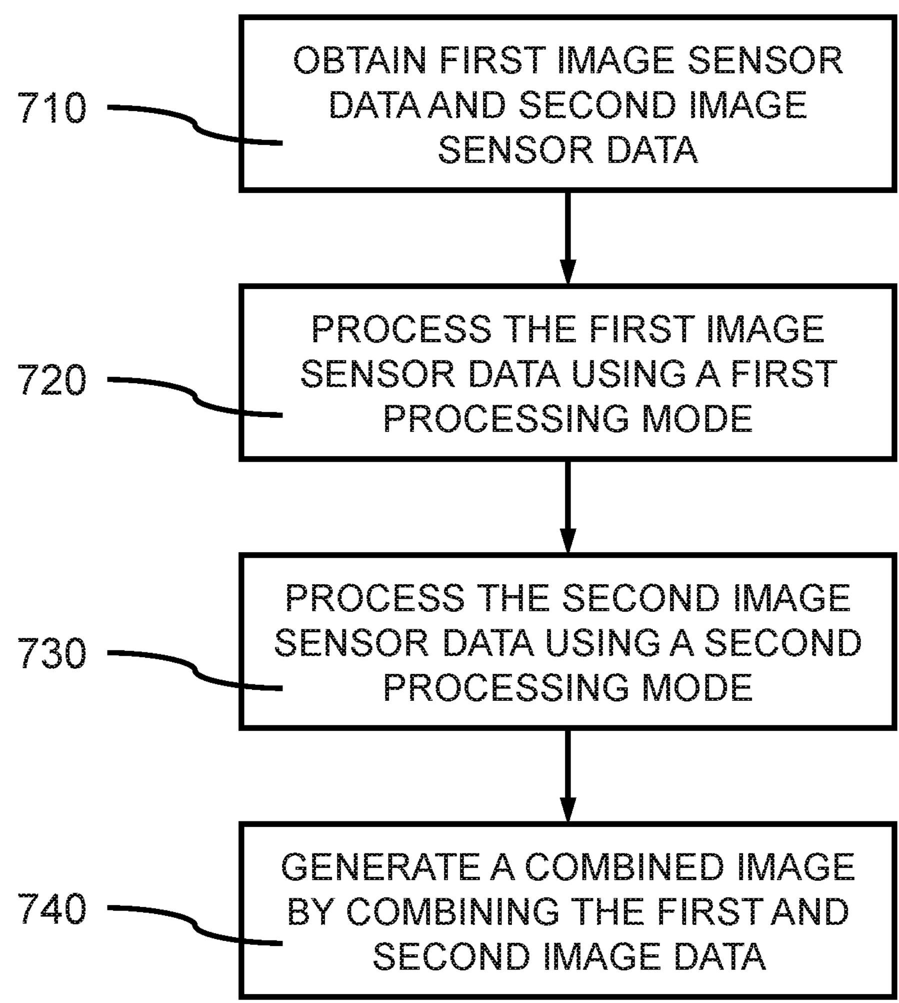
FIG. 7 shows a flow diagram for a method of performing a smooth zoom transition, according to aspects of the present disclosure.

FIG. 7 shows a flow diagram for a method of performing a smooth zoom transition, according to aspects of the present disclosure.

In various embodiments, image sensor data (e.g., digital image) can be obtained from an optical system, for example, a digital still camera or digital video camera, where the image sensor data can be communicated to one or more processing pipelines.

At operation 710, the image signal processing (ISP) system 400 can obtain first image sensor data and second image sensor data, where the image sensor data can be a digital image received from an APS of a digital camera. The first image sensor data can be spatially aligned with the second image sensor data, where the image alignment can be obtained through a mapping technique.

In various embodiments, the first image data can be obtained from the pixel array once by applying one analog binning factor. The second image data can be obtained digitally through a second binning operation, for example, via binner 460, 463.

At operation 720, the image signal processing system 400 can process the first image sensor data using a first processing mode to obtain first image data, wherein the first processing mode can be based on a first color filter pattern, for example, from a CFA and APS, where the first color filter pattern can establish a pixel pattern. The color filter pattern and pixel pattern can be determined by the resolution of the image sensor data, where the image sensor data can be at the resolution of the active pixel sensor (APS) 110. The processing mode can be selected based on a CFA format and/or a binning format, for example, 2×2 binning or 3×3 binning, or 4×4 binning for a Bayer CFA. The image data generated by the processing pipeline and the processing mode can have a lower spatial resolution than the image sensor data due to binning.

At operation 730, the ISP system 400 can process the second image sensor data using a second processing mode to obtain second image data, wherein the second processing mode can be based on a second color filter pattern different from the first color filter pattern. The second processing mode can use a different binning format compared to the binning format used for the first processing mode, such that image data can be generated at two different resolutions. The second pixel pattern can be at a different resolution than the first pixel pattern. The image data generated by the second processing pipeline and second processing mode can have a lower spatial resolution than the image data generated by the first processing pipeline and first processing mode.

At operation 740, first image data and the second image data can be used to generate a combined image for output by combining the first image data and the second image data using a weight value. The weight values can be applied pixel by pixel to the first image data and the second image data, and the resulting weighted pixel values combined, for example, by summing, to generate the pixels for the combined image. Jittery zoom transitions can occur as the result of temporal discontinuity either in the image signal source or the processing pipeline(s).

In various embodiments, the ISP system 400 can process third image sensor data using a third processing mode to obtain third image data, wherein the third processing mode can be based on a third color filter pattern different from the first and the second color filter patterns. The third processing mode can use a different binning format compared to the binning format used for the first and the second processing modes, such that image data can be generated at a different resolution. The image data generated by the third processing pipeline and third processing mode can have a lower spatial resolution than the image data generated by the first and second processing pipeline and the first and second processing mode.

In various embodiments, the output image can be scaled to an intended output resolution, where the combined image may be up-sampled or down-sampled to the output resolution. The scaled images are then averaged by the zoom dependent merger according to weights determined by the controller. For example, scaling can include interpolation of the image data points to a grid determined by the desired resolution. A merge component configured to combine the first image data and the second image data can be utilized to obtain combined image data for an output image.

Figure 8:
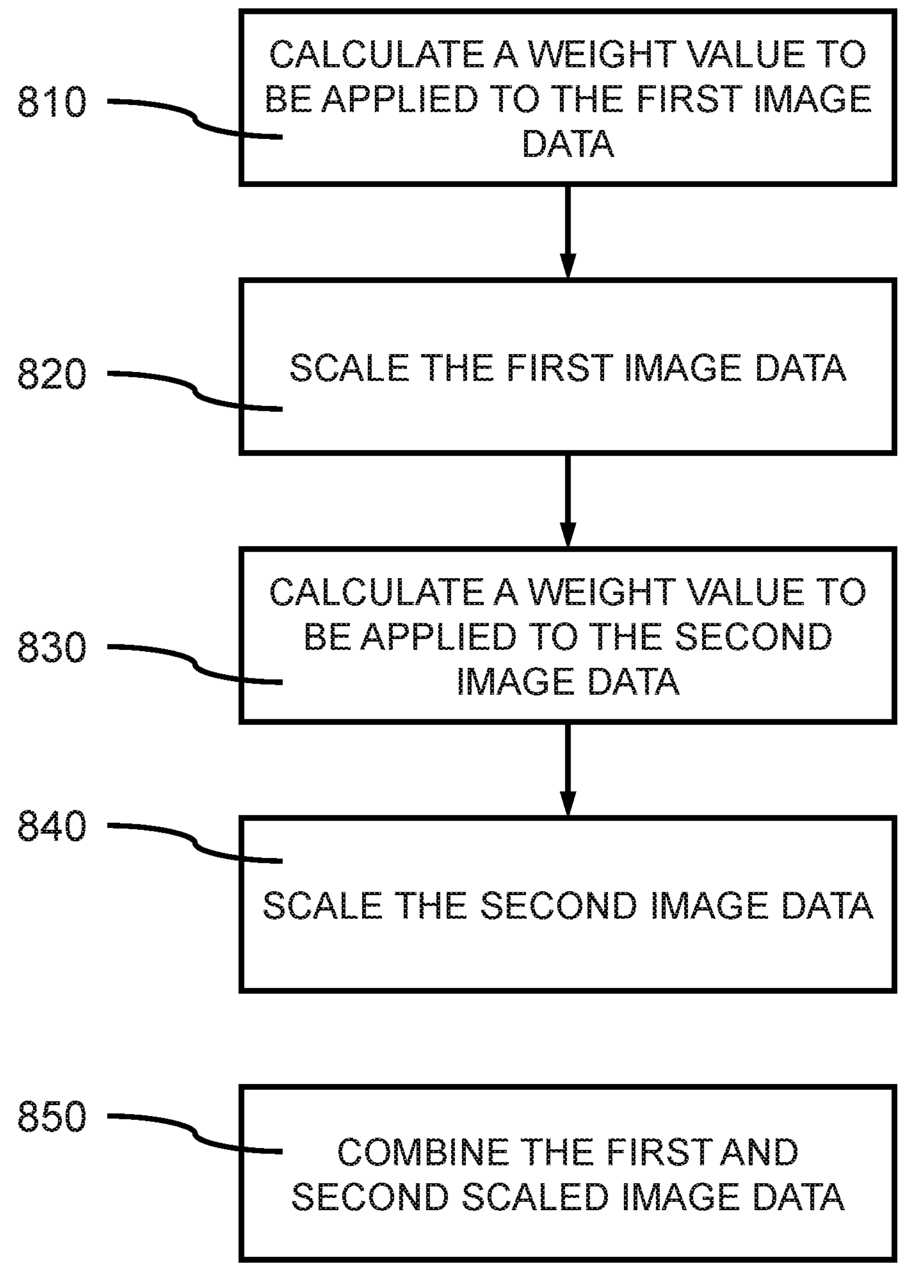
FIG. 8 shows flow diagram for a method of pipeline weight control, according to aspects of the present disclosure.

FIG. 8 shows flow diagram for a method of pipeline weight control, according to aspects of the present disclosure.

At operation 810, a first weight for the first image data can be computed based on a target parameter, for example, the zoom factor.

At operation 820, the first image data can be scaled to an intended output resolution.

At operation 830, a second weight can be computed for the second image data based on the target parameter. The first image data and the second image data can be combined based on the first weight and the second weight, respectively.

In various embodiments, the first weight and the second weight can be computed using a temporal stabilization function based on the target parameter over time. A control algorithm can gradually shift the weights to one processing pipeline to provide both a smooth transient weight distribution during the zoom change and an optimized weight distribution, where optimization can accentuate power reduction or image quality.

At operation 840, the second image data can be scaled to an intended output resolution.

At operation 850, the first scaled image data and the second scaled image data can be merged to generate a combined image at an intended resolution. A merge component can be configured to merge the first image data and the second image data to obtain a combined image from the combined image data. The combined image can be provided as an output image to a user.

Figure 9:
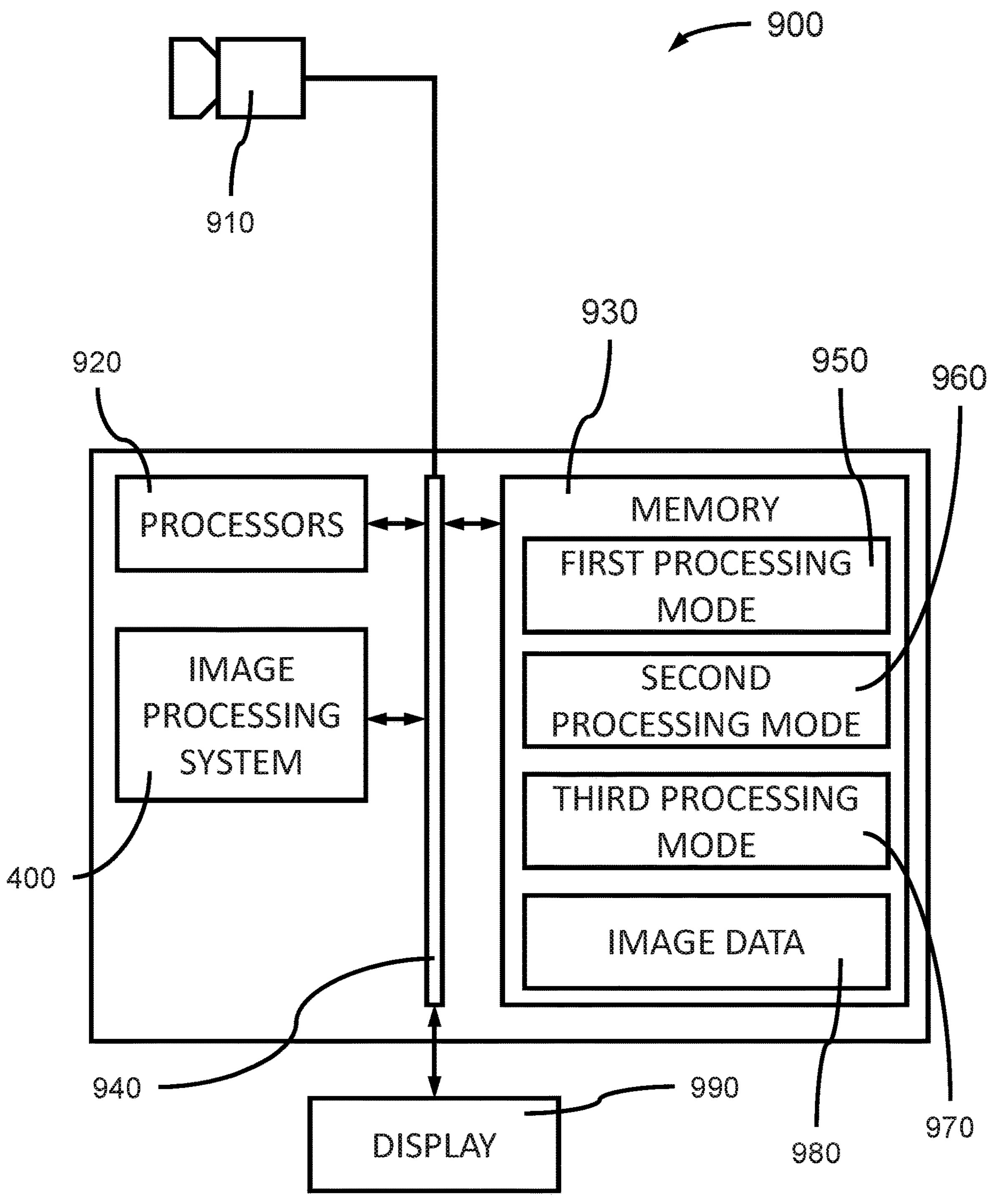
FIG. 9 shows an illustrative depiction of a camera system with multiple image processing modes, according to aspects of the present disclosure.

FIG. 9 shows an illustrative depiction of a camera system with multiple image processing modes, according to aspects of the present disclosure.

In various embodiments, a camera system 900 can include an optical system 910 (e.g., high resolution digital camera), a display 990, one or more processors 920, an ISP system 400, and memory 930, where instructions for a plurality of processing modes 950, 960, 970 can be stored in the memory 930. Image data 980 collected by the optical system 910 can be stored in the memory 930. The processor(s) 920 and image processing system 400 can communicate with the optical system 910 and memory 930 over a communication channel 940, for example, a bus. A display 990 can be connected to and in communication with the processors 920, image signal processing system 400, and memory 930 over the communication channel 940, where the display can present a readout image to a user.

Figure 10:
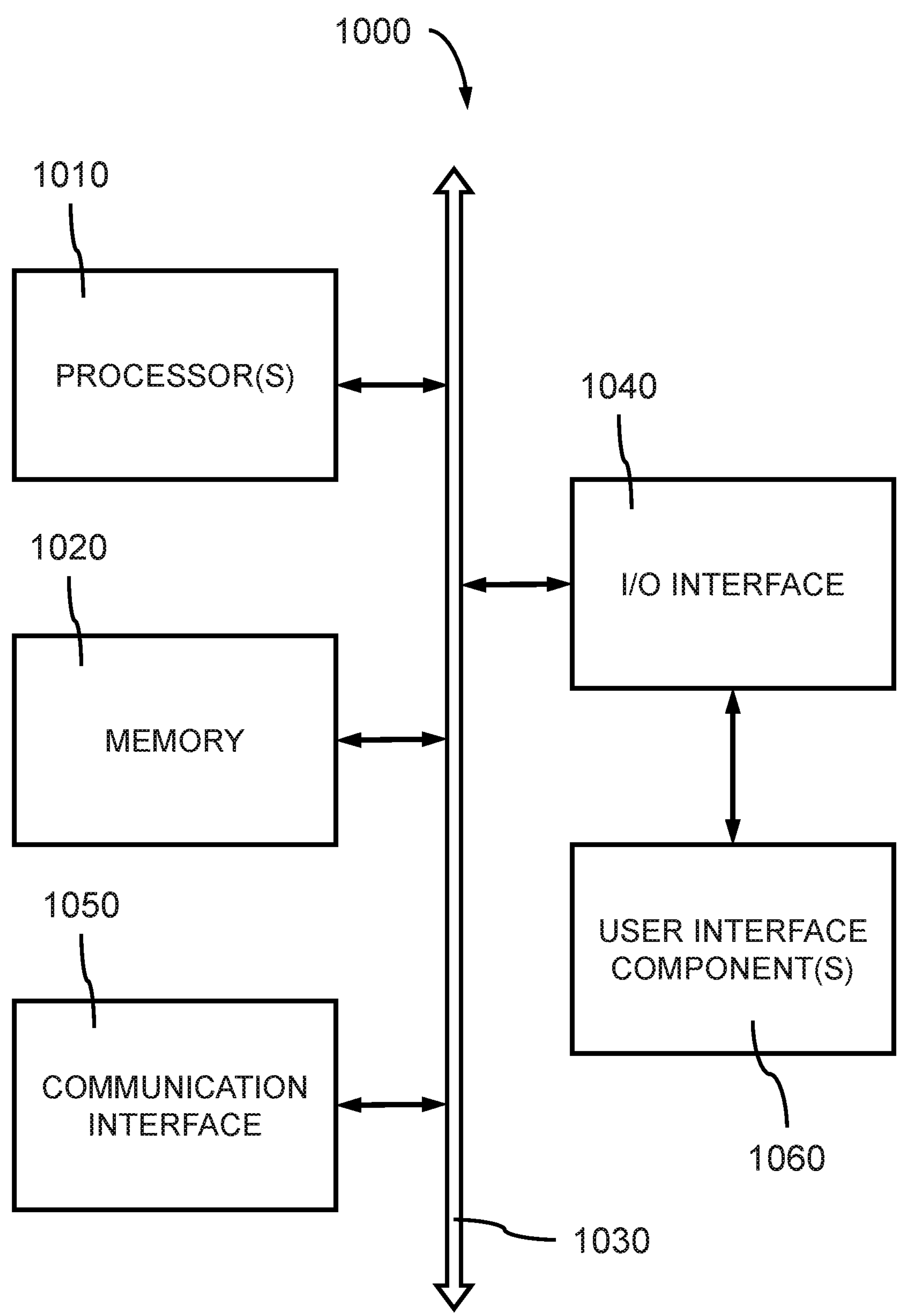
FIG. 10 shows an example of a computer system, according to aspects of the present disclosure.

FIG. 10 shows an example of a computer system, according to aspects of the present disclosure.

In an aspect, the computing device 1000 includes processor(s) 1010, memory subsystem 1020, communication interface 1050, I/O interface 1040, user interface component(s) 1060, and channel 1030. In various embodiments, a computing device 1000 can be configured to perform the operations described above and illustrated in FIG. 1-9.

In some embodiments, computing device 1000 is an example of, or includes aspects of ISP system 400 of FIG. 4 and camera system 900 of FIG. 9. In some embodiments, computing device 1000 includes one or more processors 1010 that can execute instructions stored in memory subsystem 1020 for processing received image sensor data to generate a readout image during a zoom operation of an optical system (e.g., digital camera), where the data includes attributes corresponding to the information elements.

According to some aspects, computing device 1000 includes one or more processors 1010. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1010 is configured to operate a memory array using a memory controller. In other cases, a memory controller is integrated into a processor 1010. In some cases, a processor 1010 is configured to execute computer-readable instructions stored in a memory to perform various functions. In some embodiments, a processor 1010 includes special-purpose components for modem processing, baseband processing, digital signal processing, or transmission processing.

According to some aspects, memory subsystem 1020 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory subsystem 1020 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1050 operates at a boundary between communicating entities (such as computing device 1000, one or more user devices, a cloud, and one or more databases) and channel 1030 (e.g., bus) and can record and process communications. In some cases, communication interface 1050 is provided to enable a processing system coupled to a transceiver (e.g., a transmitter and/or a receiver). In some examples, the transceiver is configured to transmit (or send) and receive signals for a communications device via an antenna.

According to some aspects, user interface component(s) 1060 enable a user to interact with computing device 1000. In some cases, user interface component(s) 1060 include an audio device, such as an external speaker system, an external display device such as a display screen, an input device (e.g., a remote-control device interfaced with a user interface directly or through the I/O controller), or a combination thereof. In some cases, user interface component(s) 1060 include a GUI.

According to some aspects, I/O interface 1040 is controlled by an I/O controller to manage input and output signals for computing device 1000. In some cases, I/O interface 1040 manages peripherals not integrated into computing device 1000. In some cases, I/O interface 1040 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component(s) 1060, including, but not limited to, a modem, a keyboard, a mouse, a touchscreen, or a similar device. In some cases, the I/O controller is implemented as a component of a processor. In some cases, a user interacts with a device via I/O interface 1040 or via hardware components controlled by the I/O controller.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining first sensor data and second sensor data;

obtaining first image data by processing the first sensor data using a first processing mode, wherein the first processing mode is based on a first pixel pattern;

obtaining second image data by processing the second sensor data using a second processing mode, wherein the second processing mode is based on a second pixel pattern different from the first pixel pattern, and wherein based on a zoom factor, the first processing mode includes performing a first pixel binning and the second processing mode includes a second pixel binning different from the first pixel binning;

generating an image by combining the first image data and the second image data;

comparing a target parameter with a plurality of threshold values including a first threshold value, a second threshold value, a third threshold value, and a fourth threshold value; and generating a subsequent image using one or more of the first processing mode, the second processing mode and a third processing mode based on a result of the comparing, wherein the comparing determines that the target parameter is above the first threshold value and the second threshold value and between the third threshold value and the fourth threshold value, and the generating generates the subsequent image using the second processing mode and the third processing mode based on the determination.

2. The method of claim 1, wherein:

the first image data is spatially aligned with the second image data.

3. The method of claim 1, further comprising:

identifying the target parameter for the image;

computing a first weight for the first image data based on the target parameter; and computing a second weight for the second image data based on the target parameter, wherein the first image data and the second image data are combined based on the first weight and the second weight, respectively.

4. The method of claim 3, wherein:

the target parameter is the zoom factor.

5. The method of claim 3, wherein:

the first weight and the second weight are computed using a temporal stabilization function based on the target parameter over time.

6. The method of claim 1, further comprising:

generating another subsequent image using the first processing mode based on a determination that the target parameter is below the first threshold value.

7. The method of claim 6, further comprising:

refraining from using the second processing mode for the subsequent image based on the determination that the target parameter is below the first threshold value.

8. The method of claim 1, further comprising:

combining the first image data and the second image data based on a determination that the target parameter is between the first threshold value and the second threshold value.

9. The method of claim 1, further comprising:

generating another subsequent image using the second processing mode based on a determination that the target parameter is above the first threshold value and above the second threshold value.

10. The method of claim 9, further comprising:

refraining from using the first processing mode for the subsequent image based on the determination that the target parameter is above the first threshold value and above the second threshold value.

11. The method of claim 1, further comprising:

refraining from using the first processing mode for the subsequent image based on the determination.

12. The method of claim 1, further comprising:

generating another subsequent image using the third processing mode based on a determination that the target parameter is above the first threshold value, the second threshold value, the third threshold value, and the fourth threshold value.

13. The method of claim 12, further comprising:

refraining from using the first processing mode and the second processing mode for the subsequent image based on the determination that the target parameter is above the first threshold value, the second threshold value, the third threshold value, and the fourth threshold value.

14. The method of claim 1, further comprising:

obtaining third image sensor data; and obtaining third image data by processing the third image sensor data using the third processing mode to obtain third image data, wherein the third processing mode is based on a third pixel pattern different from the first pixel pattern and the second pixel pattern, wherein the image is generated by combining the first image data, the second image data, and the third image data.

15. A method comprising:

obtaining first sensor data and second sensor data that is spatially aligned with the first sensor data;

obtaining first image data and second image data by processing the first sensor data and the second sensor data based on a first color filter pattern and a second color filter pattern, respectively, to obtain first image data and second image data;

obtaining first scaled image data by scaling the first image data based on a first scaling factor;

obtaining second scaled image data by scaling the second image data based on a second scaling factor different from the first scaling factor; and generating an image by combining the first image data and the second image data, wherein the image is generated by combining the first scaled image data and the second scaled image data.

16. The method of claim 15, further comprising:

obtaining first binned sensor data by binning the first sensor data based on a first binning size to obtain first binned sensor data, wherein the first image data is based on the first binned sensor data; and obtaining second binned sensor data by binning the second sensor data based on a second binning size to obtain second binned sensor data, wherein the second image data is based on the second binned sensor data.

17. An apparatus comprising:

an image sensor configured to obtain first sensor data, second sensor data, and third sensor data;

one or more processors configured to determine whether a target parameter associated with a resolution of a combined image is greater than at least one threshold value;

a memory including instructions executable by the one or more processors;

a first processing pipeline configured to obtain first image data by processing process the first sensor data using a first processing mode, wherein the first processing mode is based on a first pixel pattern;

a second processing pipeline configured to obtain second image data by processing process the second sensor data using a second processing mode, wherein the second processing mode is based on a second pixel pattern different from the first pixel pattern, and wherein based on a zoom factor, the first processing mode includes performing a first pixel binning and the second processing mode includes a second pixel binning different from the first pixel binning;

a third processing pipeline configured to obtain third image data by processing process the third sensor data using a third processing mode, wherein the third processing mode is based on a third pixel pattern different from the first pixel pattern and the second pixel pattern; and a merge component configured to generate combined image data using at least one of combine the first image data and the second image data to obtain combined image data based on a result of the comparison between the target parameter and the at least one threshold value, wherein the one or more processors are configured to generate a subsequent image using the second processing mode and the third processing mode based on the target parameter is above a first threshold value and a second threshold value and between a third threshold value and a fourth threshold value.

18. The apparatus of claim 17, wherein:

the first processing pipeline comprises first circuitry configured to process the first sensor data using the first processing mode; and the second processing pipeline comprises second circuitry configured to process the second sensor data using the second processing mode.

* * * * *